J. C. WILLEY.
Corn Planter.
No. 31,201. 197.
Patented Jan. 22, 1861.
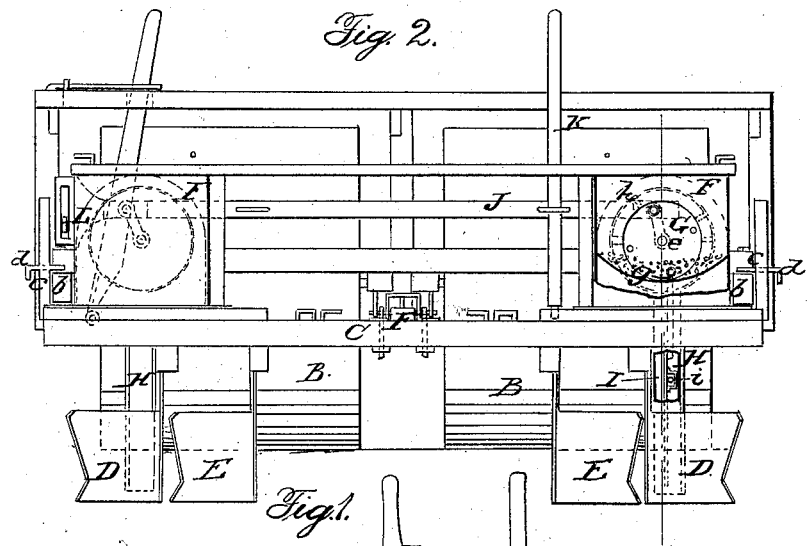
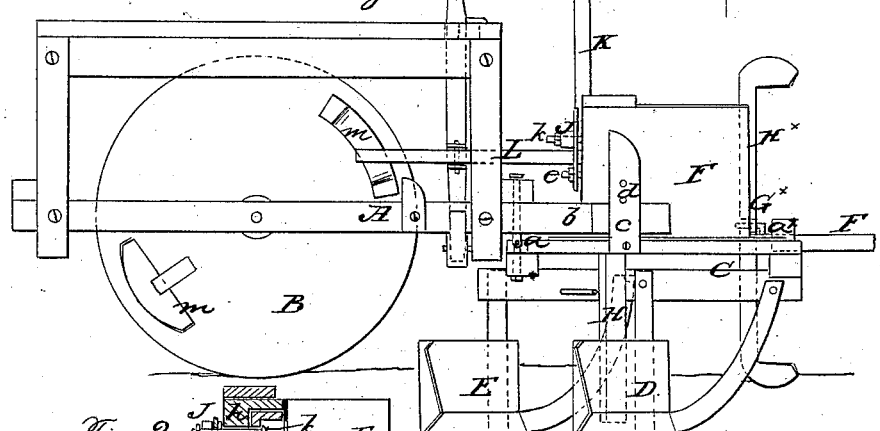
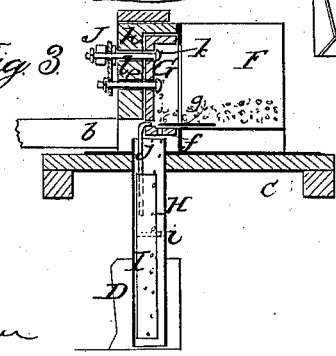
Witnesses:
Inventor.
J. C. Willey

UNITED STATES PATENT OFFICE.

WM. C. WILLEY, OF PRINCETON, ILLINOIS.

IMPROVEMENT IN CORN-PLANTERS.

Specification forming part of Letters Patent No. 31,201, dated January 22, 1861.

*To all whom it may concern:*

Be it known that I, W. C. WILLEY, of Princeton, in the county of Bureau and State of Illinois, have invented a new and Improved Corn-Planter; and I do hereby declare that the following is a full, clear, and exact description of the same, reference being had to the annexed drawings, making a part of this specification, in which—

Figure 1 is a side elevation of my invention; Fig. 2, a front elevation of the same; Fig. 3, a sectional view of the same, taken in the line $x$ $x$, Fig. 2.

Similar letters of reference indicate corresponding parts in the several figures.

The object of this invention is to obtain a simple and efficient machine for planting corn either in hills or drills and at a greater or less depth, as may be desired, the invention also admitting of having its seed-distributing apparatus operated automatically or manually, as may be desired, and without the liability of choking or clogging.

To enable others skilled in the art to fully understand and construct my invention, I will proceed to describe it.

A represents a rectangular frame, which is supported by two rollers, B B, placed on independent axles in line with each other.

To the front part of the frame A there is attached, by joints $a$, a rectangular frame, C, which is supported by shares D D E E—two at each side—the shares D being the furrow-shares and E the covering-shares, the latter being at the inner sides and behind the former ones, D. (See Figs. 1 and 2.) These shares may be of the ordinary turning mold-board form, each being provided with a mold-board and landside.

F is the draft-pole, which is attached centrally to the frame C, and has a rod, $G^\times$, connected to it by a joint, $a^\times$, to admit of the rod $G^\times$ being swung over at either side of the draft-pole. The rod $G^\times$ has a marking-bar, $H^\times$, at its end, and it is designed to mark the rows as the machine is drawn along. This device, however, is quite common, and therefore does not require a minute description.

The side bars, $b\ b$, of the frame A project over on the frame C, which frame has a small upright, $c$, at each side. Through these uprights $c$ pins $d$ pass horizontally and project over the bars $b$, the pins $d$ passing through either of a series of holes in the uprights. By this arrangement the depth of the plows D E may be graduated and the corn planted at a greater or less depth, as may be desired.

On the frame C there are placed two hoppers, F F—one at each side. At the back part of each hopper F there is placed a cylindrical shell, G, the form of which is plainly shown in Fig. 3. These shells are fitted each on one axis, $e$, and are allowed to turn freely thereon. The shells are perforated at their peripheries, as shown at $f$, and a cut-off plate, $g$, which is attached to the bottom of each hopper, projects within the shell of each, as shown in Figs. 2 and 3.

It will be seen by referring to Fig. 3 that there is a perfectly free communication between the interior of the hoppers and the shells G, and that the shells are fitted in wooden blocks $h$, to which the hoppers are attached, the latter being of sheet metal.

Directly under each shell G there is a vertical tube, H. In each tube H there is fitted, on an axis or pivot, $i$, a plate, I. These plates are nearly equal in length to the tubes, and to their upper ends rods $j$ are attached, said rods being bent and fitted in the lower parts of the shells, as shown clearly in Fig. 3. The tubes H, which are the seed-tubes, extend down between the mold-boards and landsides of the furrow-shares D.

The upper part of each shell G has a rod, $k$, attached to it. These rods pass through curved slots $l$ in the blocks $h$, and are attached at their outer ends to the ends of a horizontal bar, J, to which a vertical lever, K, is attached, and also a horizontal lever, L, the latter of which, when used, is actuated by projections $m$ on one end of a roller, B. The lever K is a hand-lever, and when used the lever L is detached from the bar J.

The operation will be readily seen. As the machine is drawn along the bar J will be vibrated by the lever L—that is, if said lever be connected to bar J—for the purpose of obtaining an automatic operation from the roller having the projections $m$ on it. If, however, it is desired to operate the bar J manually, the lever L is detached and the lever K operated by hand. The vibrating of the bar J communicates an oscillating movement to the shells G, and the corn in the hoppers is distributed therefrom through the perforations $f$ in the peripheries of the shells, the perforations filling as they move out from underneath the cut-off plates $g$, and the seed being discharged therefrom as the perforations come in line with the tubes H. At each movement of the shells G the plates I are vibrated and the corn discharged from the lower ends of the tubes H, each dropping being held by the plates I at the bottom of the tubes and discharged therefrom at the succeeding dropping or movement of the shells. The corn is planted at a greater or less depth by graduating the position of frame C through the medium of the pins $d$, as previously described.

By means of the shells G, arranged as described, the corn is distributed without the liability of choking or clogging the distributing mechanism, as the shells by their vibration agitate the whole mass of corn in the hoppers, and by having the shells perforated with different-sized holes $f$ a greater or less quantity of seed may be discharged at each dropping, the shells G admitting of being shifted, so as to bring any of the holes $f$ in operation.

I do not claim separately the vibrating plates I in the seed-tubes H, for they have been previously used; nor do I claim, broadly, the employment of the two frames connected by joints; but I do claim as new and desire to secure by Letters Patent—

The arrangement of the hoppers F, oscillating perforated shells G, holes $f$, plates $g$, vibrating bar J, and levers L K, with the seed-tubes H, plates I, shares D, jointed frames A C, bars $b\ b$, uprights $c\ c$, projections $m$, and rollers B, in the manner and for the purpose herein shown and described.

WM. C. WILLEY.

Witnesses:
WILLIAM ROSS,
RODOLPHUS CHILDS.